UNITED STATES PATENT OFFICE.

CARLTON C. JAMES, OF HONOLULU, TERRITORY OF HAWAII.

PHOSPHATIC FERTILIZER AND ART OF MANUFACTURING THE SAME.

1,348,495.  Specification of Letters Patent.  Patented Aug. 3, 1920.

No Drawing.   Application filed May 28, 1917. Serial No. 171,575.

*To all whom it may concern:*

Be it known that I, CARLTON C. JAMES, a citizen of the United States, residing in the city and county of Honolulu, Island of Oahu, Territory of Hawaii, have discovered and invented a new and useful Phosphatic Fertilizer and Art of Manufacturing the Same, of which the following is a specification.

This discovery and invention relates to phosphatic fertilizers adapted for use on acid or sour soils and an object of the discovery and invention is to produce a superior fertilizer of this character and to produce the same in an economical, convenient and satisfactory manner.

An object is to produce a fertilizer peculiarly adapted to sour soils or soils deficient in either or both phosphorus and lime. A further object is to provide a cheap fertilizer that may be manufactured in large quantities, mainly from materials that are easily obtainable in abundance from natural sources.

It is commonly understood that it is undesirable to add acid fertilizer to acid soils, for the reason that such fertilizers heretofore known make such soils more acid. An object is to obviate such difficulty. This I do by my newly discovered product, which may be broadly defined as a phosphatic fertilizer in which phosphoric acid appears principally as a di-calcium phosphate. I have discovered that a fertilizer of this character is superior in the treatment of acid soils for the reason that it tends to neutralize the acidity of the soil; will promote bacterial activity; will add available phosphoric acid and useful forms of lime such as carbonate, hydrate and sulfate, to the soil; and that it will supply necessary elements of plant growth in forms soluble in soil waters and gradually available to the plant.

I have discovered that these various objects may be attained by treating acid phosphate with a reverting agent. This I do by mixing acid phosphate and a non-phosphatic basic compound such as calcium oxid or calcium carbonate or both, or equivalents thereof, and allowing chemical action to take place under ordinary atmospheric conditions. By this means the new fertilizer above defined may be produced.

I have also discovered that by immediately delivering the mixture to the boxes, bags or other containers in which the fertilizer is to be stored or handled, all discomfort and inconvenience of handling is avoided and the process of manufacture goes on by chemical action to completion.

The reverted or basic phosphate fertilizer thus formed is alkaline in character, the super-phosphate, acid phosphate or monocalcium phosphate has been changed to an available, reverted, or dicalcic form, and a mechanically fine mixture is obtained. Preferably the mixture is delivered at once directly into the containers in which the fertilizer is to be stored or shipped, thus doing away with the handling of the product which is a fine, dusty alkaline powder that when free will permeate the air, and cause great irritation to the mucous membrane, air passages and skin of the workman.

I have used quicklime and also ground coral as the non-phosphatic calcium compound ingredients and I regard ground limestone, ground oyster shell or any finely divided form of calcium carbonate as equivalents of the calcium combinations that I have used.

In order to enable others skilled in the art of fertilizer manufacture to make use of my invention and discovery I will proceed to describe more fully its composition and the method of manufacture.

My new fertilizer is compounded or manufactured in any of the known forms of fertilizer mixing machines or upon a suitable mixing platform and is as follows:—

The phosphatic fertilizer may be made from acid phosphate and calcium oxid or from acid phosphate and calcium carbonate or from acid phosphate, calcium oxid, and calcium carbonate. Sufficient calcium oxid and calcium carbonate or the equivalents thereof must be used to effect a combination with the acid-phosphate according to the combining weights of the ingredients; but an excess of calcium oxid and calcium carbonate is preferable, in order to provide desirable increments of hydrated lime and carbonate of lime and to insure complete reversion of all water soluble phosphoric acid.

I have found by careful experiment that the rapidity of the chemical action depends upon the character of the materials used, and that where calcium carbonate is alone used as the reverting agent, the process is slow and likely to be incomplete, but where calcium oxid is used as the reverting agency, the chemical action is rapid with the evolution of excessive heat; and I have discovered that these excesses are avoided by the combined use of both calcium oxid and calcium carbonate.

The fertilizer may be produced from mixtures of the requisite ingredients in various proportions. For example the following mixture produced my phosphoric fertilizer in a highly satisfactory manner, viz.:

Acid phosphate containing 18 to 20% of phosphoric anhydrid ($P_2O_5$) in the form of mono-calcium phosphate, 80 parts by weight: calcium oxid in the form of ground quick lime 90 to 95% pure, 5 parts by weight: calcium carbonate in the form of ground coral sand, 15 parts by weight.

These ingredients are quickly and intimately mixed in any of the known forms of fertilizer mixing machines and immediately discharged into the bags, boxes, barrels or containers in which the fertilizer is to be stored or shipped. These containers, open to the atmosphere, are then set out upon the shipping platform or cooling floor and allowed to stand until the reactions are complete and the temperature has become practically reduced to that of the atmosphere. This will result by letting the container stand and cool over night. Chemical action takes place with more or less rapidity depending upon the character of the ingredients, and in the instance given, will reach the maximum intensity in from fifteen to twenty-five minutes from the time of mixing. Water, and other volatiles, are thrown off with consequent loss of weight. The di-calcium or available phosphate is formed. Hydrated lime is also formed.

The resulting product is a reverted or basic phosphate fertilizer with properties differing and apart from those of the compounding ingredients. It is a dry floury powder, alkaline toward litmus and contains practically no water soluble, or mono-calcium phosphate. The greater part of the phosphoric anhydrid is combined as di-calcium phosphate. After the mixture has cooled sufficiently, the bags, boxes, barrels or other containers may be closed for storage or shipment.

The fertilizer thus produced is in the form of a fine powder and may be applied to the soil broadcast or by drilling in a well-known manner.

By immediately delivering the raw mixture to the container before chemical reaction is well under way, not only is the inconvenience of directly handling the dusty alkaline powder that results from such action avoided, but a great saving in the storage space required is made possible for the reason that the material can be manufactured on order and shipped after standing for a few hours.

Furthermore the fertilizer does not tend to destroy jute or cotton containers and may therefore be stored in such containers for long periods.

Analyses of the products which I have made in accordance with this discovery and invention generally indicate the presence in the new fertilizer of mono-calcium phosphate, di-calcium prosphate, tri-calcium phosphate, calcium carbonate, calcium hydrate and calcium sulfate. About 5/6 of the phosphoric anhydrid ($P_2O_5$) appears as di-calcium phosphate; about 1/18 appears as mono-calcium phosphate; and about 1/9 as tri-calcium phosphate.

*Definitions.*

*Acid phosphate.*—By acid-phosphate is meant the resultant product of the action of sulfuric acid upon phosphate rock, land pebble, bone, apatite, etc., which resultant product is known also as water-soluble phosphate, super-phosphate and mono-calcium phosphate; and contains from 12.5 to 20% of phosphoric anhydrid ($P_2O_5$) combined with lime according to the formula $CaH_4(PO_4)_2H_2O$.

*Calcium oxid.*—By calcium oxid is meant the product formed by the action of heat upon calcium carbonate, and includes the material known by such terms as lime, quicklime, barrel lime, and burned lime, and is a compound of calcium containing from about 90 to 95% CaO.

*Calcium carbonate.*—This includes limestone, marble, coral rock, coral, chalk, oyster shell or any raw material that is a fairly pure source of calcium carbonate, $CaCO_3$.

It is understood that although the new composition I have produced is a fertilizer, I do not propose to limit its use to that of fertilizing land as the chemist and practical user may find many other uses than that which I have particularly pointed out.

I claim:

1. A phosphatic fertilizer manufactured from 80% acid phosphate, 15% ground calcium carbonate and 5% lime (CaO).

2. The method of manufacture of a phosphatic fertilizer by the action of 15% ground calcium carbonate and 5% lime upon 80% acid phosphate.

3. The phosphatic fertilizer manufactured from acid phosphate and lime (CaO) by combining them in proportion to their combining weights.

4. The phosphatic fertilizer manufactured from acid phosphate and ground calcium carbonate by combining them in proportion to their combining weights.

5. The phosphatic fertilizer manufactured from acid phosphate, lime (CaO) and calcium carbonate by combining them in proportion to their combining weights.

6. The method of producing phosphatic fertilizers set forth which consists in mixing acid phosphate and a non-phosphatic basic compound containing calcium carbonate.

7. The method set forth of producing phosphatic fertilizer which consists in mixing acid phosphate and a non-phosphatic basic compound containing calcium oxid and calcium carbonate.

8. The phosphatic fertilizer set forth, characterized as a chemical combination of acid phosphate and calcium oxid in the proportions substantially set forth.

9. The phosphatic fertilizer set forth the same being the pulverulent product resulting from a mixture of acid phosphate and calcium carbonate allowed to stand subject to atmospheric action until chemical reactions are completed.

10. A phosphatic fertilizer manufactured by mixing calcium oxid, calcium carbonate and acid phosphate in the atmosphere and allowing the mixture to stand until the reactions are complete.

11. The phosphatic fertilizer set forth characterized by the chemical combination of calcium oxid, calcium carbonate and acid phosphate in the proportions substantially set forth.

12. The method of manufacturing a phosphatic fertilizer which consists in mixing acid phosphate and a reverting agent and immediately delivering the same to the container in which the fertilizer is to be handled so as to do away with the direct handling of the resulting dusty and alkaline powder, and allowing the mixture to remain in said container until chemical reactions have taken place and such powder has been produced in the container.

13. The phosphatic fertilizer set forth characterized as a dry powder containing di-calcium phosphate, tri-calcium phosphate, calcium carbonate, calcium hydrate and calcium sulfate and alkaline toward litmus.

14. The phosphatic fertilizer set forth characterized as a dry powder containing phosphoric anhydrid, about 5/6 of which phosphoric anhydrid is combined in the form of di-calcium phosphate and about 1/9 of which phosphoric anhydrid is in the form of tri-calcium phosphate; said fertilizer also containing calcium carbonate, calcium hydrate and calcium sulfate, and being alkaline toward litmus.

15. The phosphatic fertilizer set forth characterized as a dry powder containing phosphoric anhydrid, about 5/6 of which phosphoric anhydrid is combined in the form of di-calcium phosphate and about 1/9 of which phosphoric anhydrid is in the form of tri-calcium phosphate; said fertilizer also containing a calcium compound resulting from the chemical reaction taking place in the mixture of acid phosphate and a non-phosphatic basic compound which acts as a reverting agent in the presence of air.

16. The basic phosphate fertilizer set forth, consisting as a dry floury powder, alkaline toward litmus and containing practically no water soluble or mono-calcium phosphate; the greater part of the phosphoric anhydrid being combined as di-calcium phosphate.

17. As a new manufacture the above-described pulverulent phosphatic fertilizer in which phosphoric acid appears principally as a di-calcium phosphate.

In testimony whereof I have hereunto set my hand at Los Angeles, California, this 10th day of May, 1917.

CARLTON C. JAMES.

Witness:
JAMES R. TOWNSEND.